(12) United States Patent
Fong

(10) Patent No.: US 6,763,666 B2
(45) Date of Patent: Jul. 20, 2004

(54) CONSOLE HEATING AND COOLING APPARATUS

(75) Inventor: Ching Fong, Canton, MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 10/312,943

(22) PCT Filed: Jun. 27, 2001

(86) PCT No.: PCT/US01/20477
§ 371 (c)(1),
(2), (4) Date: Aug. 1, 2003

(87) PCT Pub. No.: WO02/00458
PCT Pub. Date: Jan. 3, 2002

(65) Prior Publication Data
US 2004/0025517 A1 Feb. 12, 2004

Related U.S. Application Data
(60) Provisional application No. 60/214,579, filed on Jun. 28, 2000.

(51) Int. Cl.$^7$ ................................................ F25B 21/02
(52) U.S. Cl. .............................. 62/3.61; 62/3.2; 62/3.6; 62/244
(58) Field of Search ............................. 62/3.2, 3.3, 3.6, 62/3.61, 239, 244

(56) References Cited

U.S. PATENT DOCUMENTS

| | | | |
|---|---|---|---|
| 3,823,567 A | * | 7/1974 | Corini .......................... 62/3.6 |
| 4,823,554 A | | 4/1989 | Trachtenberg et al. ........... 62/3 |
| 5,099,649 A | | 3/1992 | Zorn .......................... 62/3.61 |
| 5,621,614 A | | 4/1997 | O'Neill ...................... 361/698 |

* cited by examiner

Primary Examiner—Melvin Jones
(74) Attorney, Agent, or Firm—Grossman, Tucker, Perreault & Pfleger, PLLC

(57) ABSTRACT

A temperature controlled storage container integrated into the trim member of a vehicle comprising a storage container integrated into said trim member. A thermoelectric heat pump is employed to provide temperature control to the storage container and to selectively heat or cool the container. Optionally, a duct is added that is in communication with the thermoelectric heat pump wherein the duct is also in communication with air intake resulting from motion of the vehicle and wherein the duct is also capable of venting outside of said vehicle.

10 Claims, 1 Drawing Sheet

CONSOLE HEATING AND COOLING APPARATUS

CROSS REFERENCE TO RELATED APPLICATIONS

Figure 1:
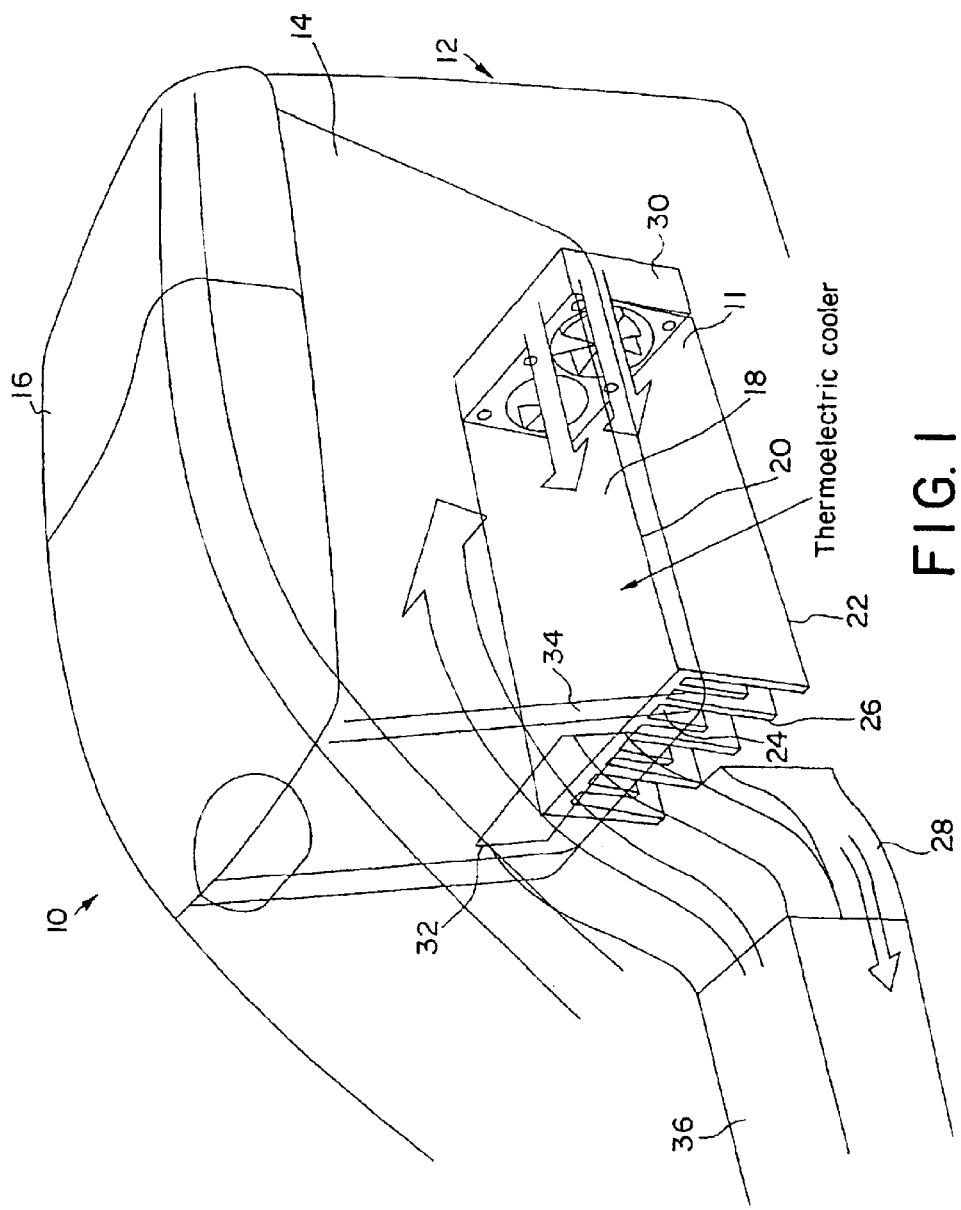

This application is a U.S. national stage completion of International Application No. PCT/US01/20477 filed Jun. 27, 2001, and published Jan. 3, 2002 as International Publication No. WO 02/00458, designating the United States, and which claims benefit of U.S. Provisional Application No. 60/214,579 Jun. 28, 2000.

This invention relates generally to automotive temperature controlled storage containers, and more particularly, to temperature controlled storage containers integrated into automotive interior trim members.

To better understand and appreciate the invention, refer to the following detailed description in connection with the accompanying drawings:

FIG. 1 is a perspective view of a temperature controlled storage container according to the present invention.

A temperature controlled storage container integrated into the trim member of a vehicle comprising a storage container integrated into said trim member. A thermoelectric heat pump is employed to provide temperature control to said storage container to selectively heat or cool the container. Preferably, a duct is added that is in communication with said thermoelectric heat pump wherein said duct is also in communication with air intake resulting from motion of said vehicle and wherein said duct is also capable of venting outside of said vehicle.

As shown in FIG. 1, the temperature controlled storage container 10 of the present invention is integrated into an interior trim member 12 of an automotive vehicle. More specifically, temperature controlled storage container 10 is shown integrated in the center console of an automotive vehicle, although it may be integrated in any interior trim member such as the instrument panel, quarter trim panels, parcel shelf, door panels, or close-out panels.

Preferably temperature controlled storage container 10 comprises a cavity 14 disposed in the interior trim member 12. Furthermore, it is preferred that storage container 10 be closeable, either by way of a hinged or a sliding door 16. Alternately, storage container 10 may comprise a separate container or bin that mounts in an automotive interior trim member, as through an aperture in the trim feature, between the trim panel and the vehicle chassis or otherwise.

In consideration of efficiently maintaining a cooled or heated environment within temperature controlled storage container 10, it is preferred that storage container 10 comprise an insulating means. Insulating means is preferably provided to fully insulate storage container 10, including door 16. The preferred insulating means comprises an expanded polymeric foam, including, but not limited to, polystyrene, polypropylene, polyethylene and polyurethane.

Alternately, insulating means may comprise an at least partially enclosed airspace, or an at least partially evacuated region, surrounding temperature controlled storage container 10. Such a temperature controlled storage container 10 may be manufactured using a plastic blow molding operation, therein easily achieving a double walled container having a void between spaced apart walls. The void between the spaced apart walls may optionally be evacuated to further improve the insulating capacity of storage container. Furthermore, the blow molding operation may be used to manufacture storage container 10 integrally with a trim member.

Temperature control for storage container 10 is provided by a thermoelectric heat pump. Preferably the thermoelectric heat pump is a solid state thermoelectric cooler/heater 11 of the variety known in the art.

A thermoelectric cooler/heater 11 is made even more desirable by the fact that direction of heat flow can be reversed by a reversal of the direction of flow of the electric current through the system. By this method, temperature controlled storage container 10 may be used to provide a heated environment (e.g. above the ambient temperature of the passenger compartment of the vehicle or outside surroundings) as well as a cooled environment (e.g. below the ambient temperature of the passenger compartment of the vehicle or vehicle outside surroundings).

The thermoelectric cooling/heating unit 11, as illustrated in FIG. 1, comprises an internal heat sink 18 (i.e. a heat sink thermally coupled to the cavity 14 of the temperature controlled storage container 10). The internal heat sink 18 may comprise a plate (shown) disposed on one of the cavity surfaces of storage container 10, or may alternately comprise a plurality of fins projecting into the cavity 14 of storage container 10. A fin may be circular, for example, in which case a beverage can or bottle may be placed within its confines.

Internal heat sink 18 is thermally coupled to a first side of the thermoelectric cooling/heating module 20. The opposing side of the thermoelectric cooling/heating module 20 is in turn thermally coupled to an external heat sink 22 (i.e. a heat sink not thermally coupled to the cavity 14 of the temperature controlled storage container 10). Thermoelectric cooling/heating module 20 transports heat from internal heat sink 18 to external heat sink 22 when operating to heat the cavity 14 temperature of storage container 10 or, vice-versa, to cool the cavity 14 storage container 10.

External heat sink 22 must dissipate heat when cavity 14 of storage container 10 is being cooled, and gather heat when cavity 14 of storage container 10 is being heated. Preferably external heat sink 22 comprise a continuous surface 24 having fins 26 projecting therefrom. To provide efficient heat dissipation or absorption, it is preferred that external heat sink 22 be positioned to allow free air circulation about fins 26. It is further preferred that at least a portion of fins 26 be in fluid communication with a duct 28.

The efficiency of heat dissipation or absorption by external heat sink 22 may be further improved by providing a means for forced convection across fins 26. Forced convection is preferably provided through the use of a fan or blower 30 in fluid communication with duct 28. Preferably duct 28 is capable of venting outside of the vehicle passenger compartment to prevent any undesired heating or cooling of the passenger compartment Duct 28 may optionally also contain an air intake disposed to make use of "ram air" induction, i.e. forced convection resulting from the motion of the vehicle.

The heating capacity of thermoelectric cooling/heating unit 11 may be improved by increasing the ambient air temperature proximate external heat sink 18. In an automotive environment this is most easily accomplished using the vehicle heating system. A stream of heated air produced by the vehicle heating system may be selectively supplied to external heat sink 18 through duct 28. To prevent undesired heating of the vehicle passenger compartment, duct 28 may optionally allow for venting to the exterior of the passenger compartment. Vice-versa, the cooling capacity of the thermoelectric cooling/heating unit 11 may be improved by decreasing the ambient temperature proximate external heat sink 18.

Thermoelectric cooling/heating unit 11 is preferably supplied with the requisite electrical power from the vehicles electrical system. Alternately, thermoelectric cooling/heating unit 11 may possess a separate power supply, such as a dedicated battery. A separate power supply for thermoelectric cooling/heating unit may optionally be configured to be chargeable from the vehicle electrical system.

When temperature controlled storage container 10 is to be capable of operation even when the vehicle is not running, undesirable drain of the vehicle battery may be prevented through the incorporation of a battery power level sensor, such as a volt meter. The controller for the thermoelectric cooling/heating unit is preferably configured to discontinue operation when the charge on the vehicle battery falls below a predetermined level.

In considering the storage of a variety of items with differing optimum storage temperatures, it is preferred that temperature controlled storage container 10 be equipped with a means for controlling the temperature of cavity 14 storage container 10. Temperature control is most easily accomplished using a conventional thermostat known in the art. The thermostat may be configured to control the thermoelectric cooling/heating unit in an on/off, proportional, proportional/integral, proportional/derivative, or proportional/integral/derivative.

The overall cooling/heating capacity of temperature controlled storage container 10 may optionally be increased by providing storage container 10 with additional thermoelectric cooling/heating units, and/or increasing the size of the thermoelectric cooling/heating unit 11. Thermoelectric cooling/heating unit 11 may be sized to be substantially coextensive with an interior surface of temperature controlled storage container 10. Additionally, temperature controlled storage container may be provided with thermoelectric cooling/heating units on more than one interior surface, e.g. the bottom interior surface and one, or more, or the sidewall interior surfaces.

Similarly, the maximum temperature differential, i.e. the difference between ambient temperature of the passenger compartment or outside vehicle surroundings and the temperature of cavity 14 of storage container 10, may be increased by cascading thermoelectric cooling/heating unit. A cascaded thermoelectric cooling/heating unit comprises a plurality of individual thermoelectric cooling/heating units, modules, stacked such that adjacent modules share a common heat sink.

In addition to the use of thermoelectric cooling/heating unit 11, cavity 14 of storage container 10 may be supplemented with heated or cooled air from the vehicle's heating and cooling systems, such as the HVAC unit. This will speed the cooling or heating of cavity 14 of storage container 10 as composed to when thermoelectric cooling/heating unit 11 is usual solely. The air may flow through a duct 36 and enter into cavity 14 of storage container 10 through an aperture 32. Preferably, aperture 32 may be closed by a door or flap 34 when air from the vehicle's heating and cooling system is not provided.

What is claimed is:

1. A temperature controlled storage container integrated into the trim member of a vehicle comprising:
    (a) a storage container integrated into said trim member
    (b) a thermoelectric heat pump to provide temperature control to said storage container to selectively heat or cool said container
    (c) a duct in communication with said thermoelectric heat pump wherein said duct is in communication with air intake resulting from motion of said vehicle and wherein said duct is also capable of venting outside of said vehicle.

2. The temperature controlled storage container of claim 1 wherein said vehicle contains a heating/cooling system and said duct is in communication with said heating/cooling system to thereby increase the heating/cooling capacity of said thermoelectric heat pump.

3. The temperature controlled storage container of claim 1 wherein said trim member is a center console.

4. The temperature controlled storage container of claim 1 wherein said trim component is an instrument panel.

5. The temperature controlled storage unit of claim 1 wherein said trim component is a quarter panel.

6. The temperature controlled storage unit of claim 1 wherein said trim component is a rear parcel shelf.

7. The temperature controlled storage unit of claim 1 wherein said trim component is a vehicle close-out panel.

8. The temperature controlled storage unit of claim 1 wherein said storage container is of hollow construction.

9. The temperature controlled storage unit of claim 8 wherein said hollow construction is filled with an insulating material.

10. The temperature controlled storage unit of claim 9 wherein the insulating material is foam.

* * * * *